Aug. 15, 1961
V. R. MUMMA
2,996,624
METHOD FOR STRETCHING PHOTOMETER PULSES FOR
ACCURATE MEASUREMENT OF PULSE HEIGHT
Filed Aug. 11, 1959
2 Sheets-Sheet 2
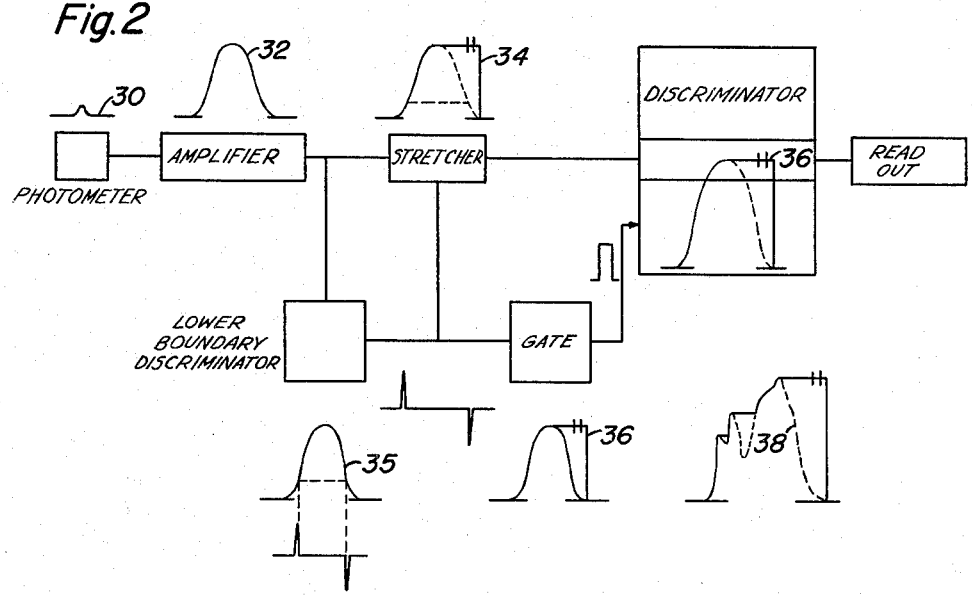
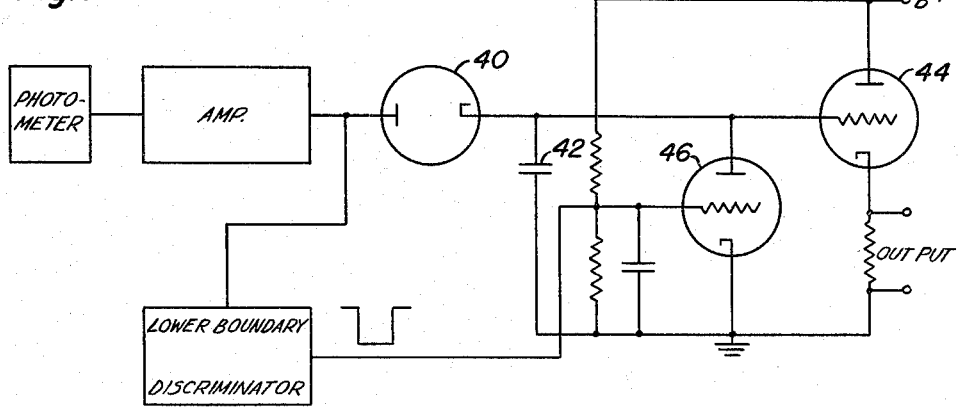
INVENTOR
Victor R. Mumma
BY George Renehan
ATTORNEY

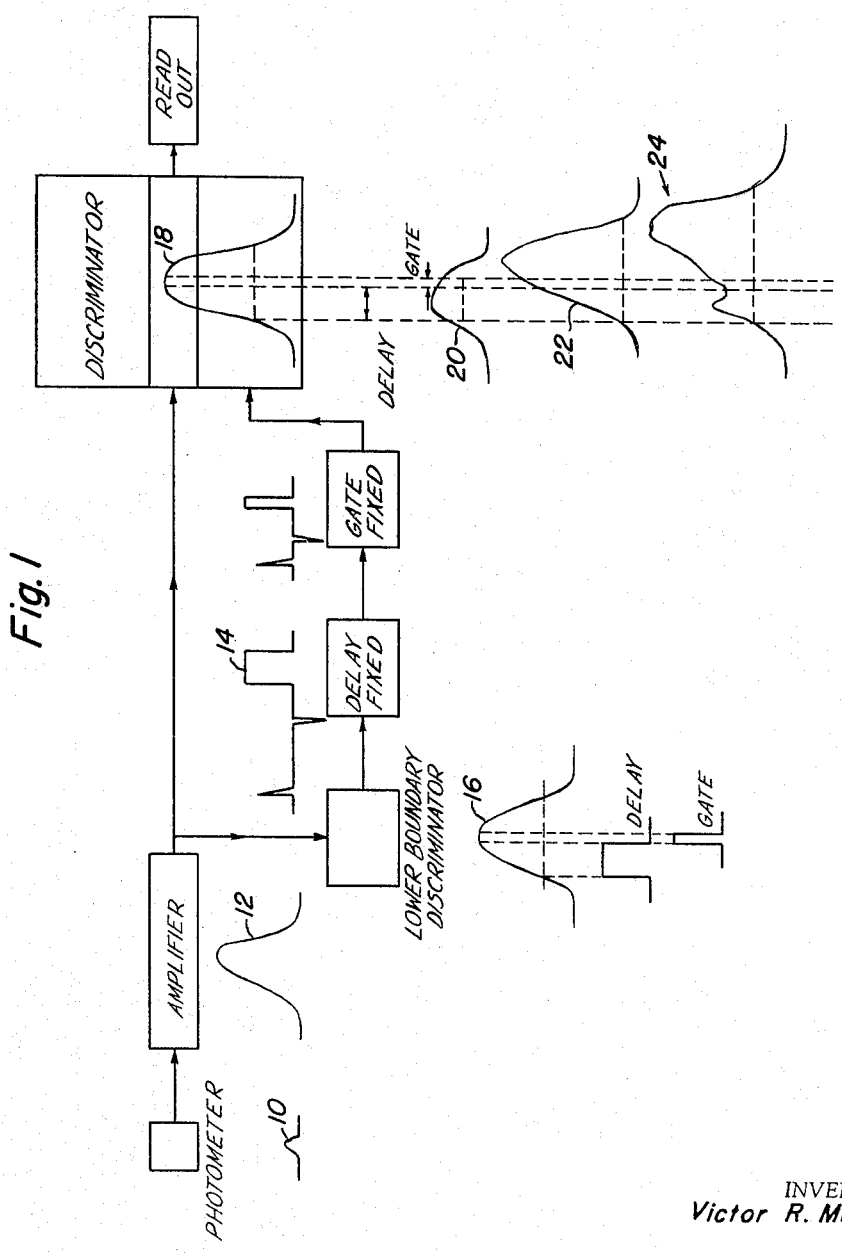

United States Patent Office 2,996,624
Patented Aug. 15, 1961

2,996,624
METHOD FOR STRETCHING PHOTOMETER PULSES FOR ACCURATE MEASUREMENT OF PULSE HEIGHT
Victor R. Mumma, Boonsboro, Md., assignor to the United States of America as represented by the Secretary of the Army
Filed Aug. 11, 1959, Ser. No. 833,114
3 Claims. (Cl. 250—218)
(Granted under Title 35, U.S. Code (1952), sec. 266)

The invention described herein may be manufactured and used by or for the Government of the United States of America for governmental purposes without the payment to me of any royalty thereon.

Photometer systems have been developed that count the particles of an aerosol by passing the particles through a highly illuminated optical volume. Scattered light from the particles fall on a photo tube and the resulting voltage pulses are amplified and counted. An example of this type of mechanism appears in Patent No. 2,732,753 to O'Konski. This patent also shows the use of a pulse height discriminator which when set to a predetermined level will reject pulses below a certain amplitude and respond to pulses above this same amplitude. Suitable means are then provided to count the pulses according to size.

FIG. 1 is a block diagram of a fixed delayed gating circuit used in prior-art photometer systems;

FIG. 2 is a block diagram of a photometric system embodying this invention;

FIG. 3 is a schematic circuit diagram of a photometric system embodying this invention.

It is the practice in photometer systems to employ fixed delay gating circuits in counting the voltage pulses from the photoelectric tube. In practice, these pulses are presented both to the discriminator and to a lower boundary discriminator. The latter senses the presence of the pulse by noting a sharp rise in the wave front of the signal. When the height of the photometer pulse exceeds the preset lower boundary line, a fixed delay is initiated. Attempt is usually made to make this delay approximately half the transit time. At the end of the delay a gating pulse is initiated which causes the photometer pulse to be recorded at whatever height it is at the time of this gating pulse. This system is shown in FIG. 1. If all photometer pulses were of equal transit times and were symmetrical, the gating pulse would always occur at the center of the photometer pulse which is then at its maximum value. Unfortunately, due to irregularities in transit time and pulse shape and size, the maximum of the photometer pulse height does not necessarily occur at a fixed time after initiation of the pulse. This can be illustrated by reference to FIG. 1 which shows the output of a photometer at 10. After passing through an amplifier, this symmetrical wave appears as at 12. This signal triggers a lower boundary discriminator which creates a square wave front as shown at 14. Depending upon the average shape of the particles counted, a fixed delay is introduced, which in turn triggers a gate circuit which automatically sizes the particle at whatever voltage level then appears. Where the time delay is tailored correctly to the wave size and shape it results in measuring the same at its maximum value as seen at 16 and in the discriminator as at 18. This is purely a fortuitous case, however, and particles which have a different waveform are not measured at their maximum voltage. Where the wave front rises rapidly as at 20, this fixed delay circuit will cause a pulse to be measured some time after maximum whereas a sloping wavefront 22, will result in measuring the pulse some time before maximum. In 24 is shown an irregular pulse with maximum voltage being considerably delayed. This results in considerable error in measuring the maximum voltage.

To obviate the errors produced by the fixed delay gating system of FIG. 1 the present invention modifies this circuit by removing the fixed delay after the lower boundary discriminator and introducing a stretcher element into the main line between the amplifier and the discriminator as shown in FIG. 2.

In this circuit, the photometer and amplifier function as before with pulse 30 and 32. After the amplifier, the pulse travels to the lower boundary discriminator which triggers a square wave as indicated under FIG. 1. Simultaneously the pulse also passes to the stretcher which includes a rectifier and capacitor circuit, to maintain the voltage at whatever maximum is reached by the pulse. A stretched pulse is shown at 34 and this is fed into the discriminator to be counted. In the meantime the pulse has passed through the lower boundary discriminator from which it emerges as a square wave having its terminus of rise and fall on the pulse voltage trace of the amplified pulse shown at 35. The fall of this square wave triggers the gate circuit which then counts and measures this pulse at the stretched maximum shown at 36. This same principle works successfully on an irregular waveform shown at 38, since the gate circuit is not triggered until the waveform falls below the lower boundary discriminator setting. The latter setting is always preset at a value below the smallest voltage pulse that is to be counted. At the same time it is preset as high as possible to prevent circuit noises from triggering the gate. Given a reasonable amount of amplification, the noise voltage may be in the vicinity of 2 volts while a 1 micron particle will have a pulse of about 20 volts. This provides a signal to noise ratio of better than 10 to 1 and leaves considerable latitude for the setting of the lower boundary discriminator.

The circuitry for the pulse stretcher and discriminator appears in FIG. 3. The photometer, amplifier and lower boundary discriminator are conventional and are shown in block form as in FIGS. 1 and 2. The stretcher is a simple diode rectifier 40, which passes a positive pulse to the grid of triode 44. Condenser 42 serves to store this pulse and to maintain the voltage on the grid of 44 substantially constant for the duration of the pulse. The charge on the condenser biases the rectifier so only positive increases add to its charge. This charge remains on 42 until the electronic switch 46 is triggered by the lower boundary discriminator, whereupon triode 46 is made conducting and the charge on 42 is bled off and quickly falls to zero. The output tube 44 is coupled as a cathode follower system. The circuit shown in FIG. 2 includes a lower boundary discriminator and gate circuit in parallel with the stretcher circuit, the latter comprising a diode followed by a capacitor to ground between said amplifier and discriminator read out system, said diode and capacitor serving as a rectifier system to stretch and extend the highest pulse voltage until the original pulse has collapsed, thereby enabling the parallel gate circuit to trigger a counting and measuring pulse which counts and sizes the pulse at its maximum level.

I claim:

1. A method for measuring relative pulse height, of pulses originating in a photoelectric tube, which method comprises passing the amplified pulse simultaneously into a pulse stretcher and a lower boundary discriminator, said lower boundary discriminator serving to produce a square wave having its terminus of rise and fall on the pulse voltage trace of the amplified pulse, utilizing the fall of this square wave to trigger a gate circuit which counts and measures the stretched pulse.

2. Apparatus for measuring relative pulse height of pulses originating in a photoelectric tube, which apparatus includes a photoelectric tube, an amplifier for amplifying the output of said photoelectric tube, a pulse stretcher having its input terminal connected to the output terminal of said amplifier, said pulse stretcher including a diode and a capacitor to ground following said diode, to maintain the voltage at the maximum reached by the amplified pulse, a circuit discriminator means following said pulse stretcher which means serves to count and measure the output of said pulse stretcher, a lower boundary discriminator in parallel with said pulse stretcher and having its input connected to the output of said amplifier, said lower boundary discriminator including circuit means for producing a square wave having its terminus of rise and fall on the voltage trace of the amplified pulse, a gate circuit following said lower boundary discriminator, a second circuit means for utilizing the trailing edge of said square wave to trigger said gate circuit and to cause said circuit discriminator means to count and measure said pulse.

3. An apparatus in accordance with claim 2 wherein said lower boundary discriminator generates a square wave of an amplitude that is below any voltage pulse that is to be counted and where said gate unit generates a counting pulse which determines the moment when the pulse height is measured and counted.

References Cited in the file of this patent

UNITED STATES PATENTS

| | | |
|---|---|---|
| 2,572,080 | Wallace | Oct. 23, 1951 |
| 2,732,753 | O'Konski | Jan. 31, 1956 |
| 2,791,695 | Bareford et al. | May 7, 1957 |
| 2,891,722 | Nuttall et al. | June 23, 1959 |
| 2,920,525 | Appel et al. | Jan. 12, 1960 |
| 2,922,879 | Vogt et al. | Jan. 26, 1960 |